Figure 19:
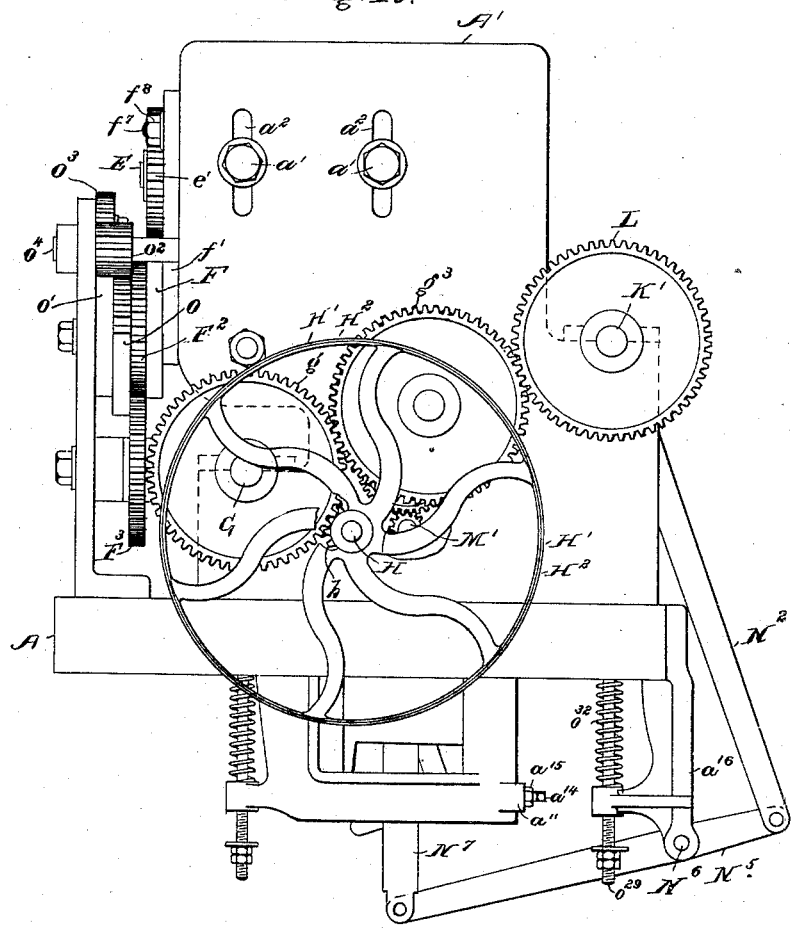

(No Model.) 12 Sheets—Sheet 1.
J. C. CORAM & F. D. HUNTOON.
MACHINE FOR MAKING PAPER TUBES.
No. 475,721. Patented May 24, 1892.
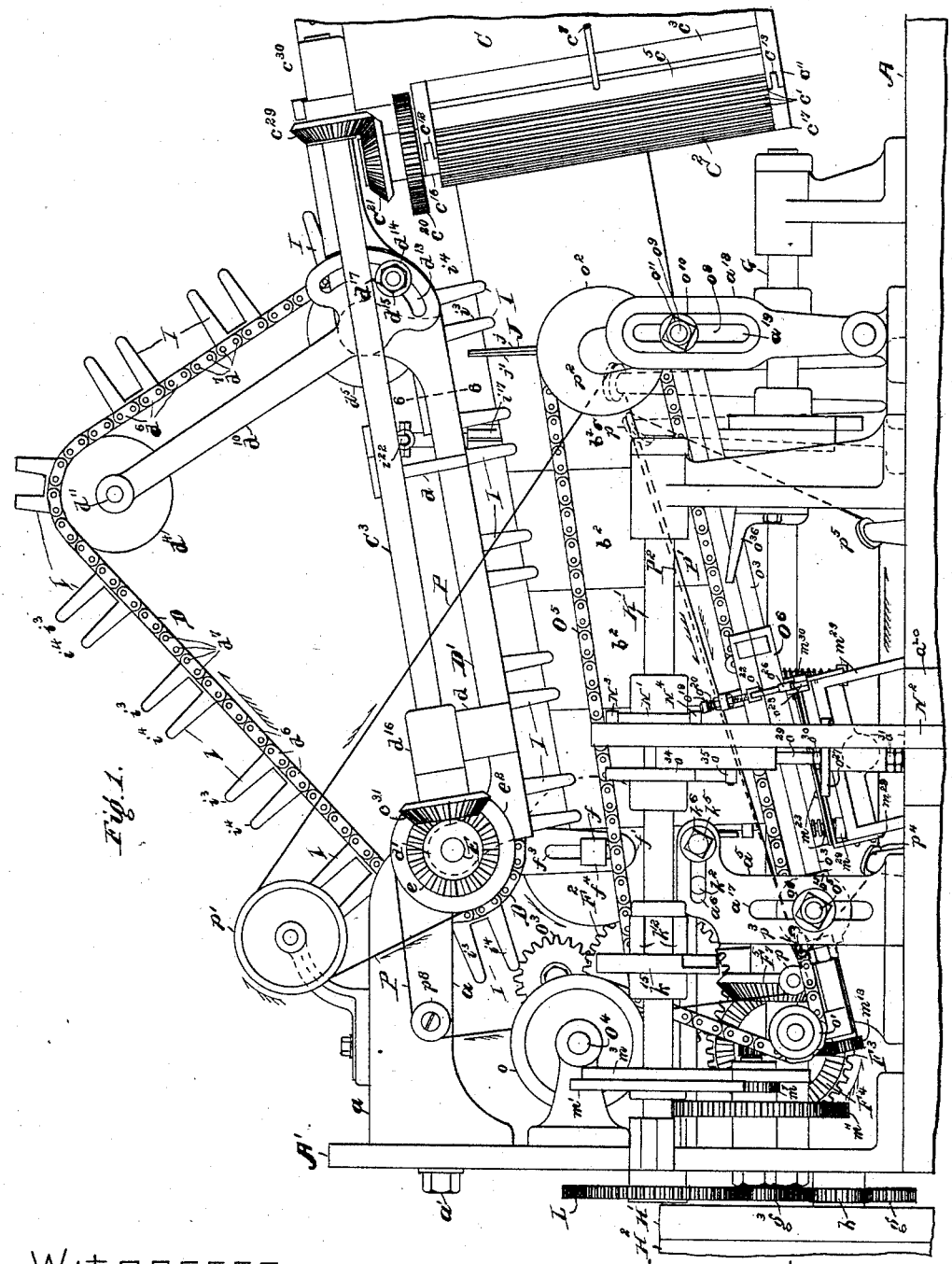
Witnesses
Kirkley Hyde.
Myrtie C Beals.
Inventors
John C. Coram &
Frank D. Huntoon,
By Albert M. Moore,
Their Attorney.

(No Model.) 12 Sheets—Sheet 2.
J. C. CORAM & F. D. HUNTOON.
MACHINE FOR MAKING PAPER TUBES.
No. 475,721. Patented May 24, 1892.
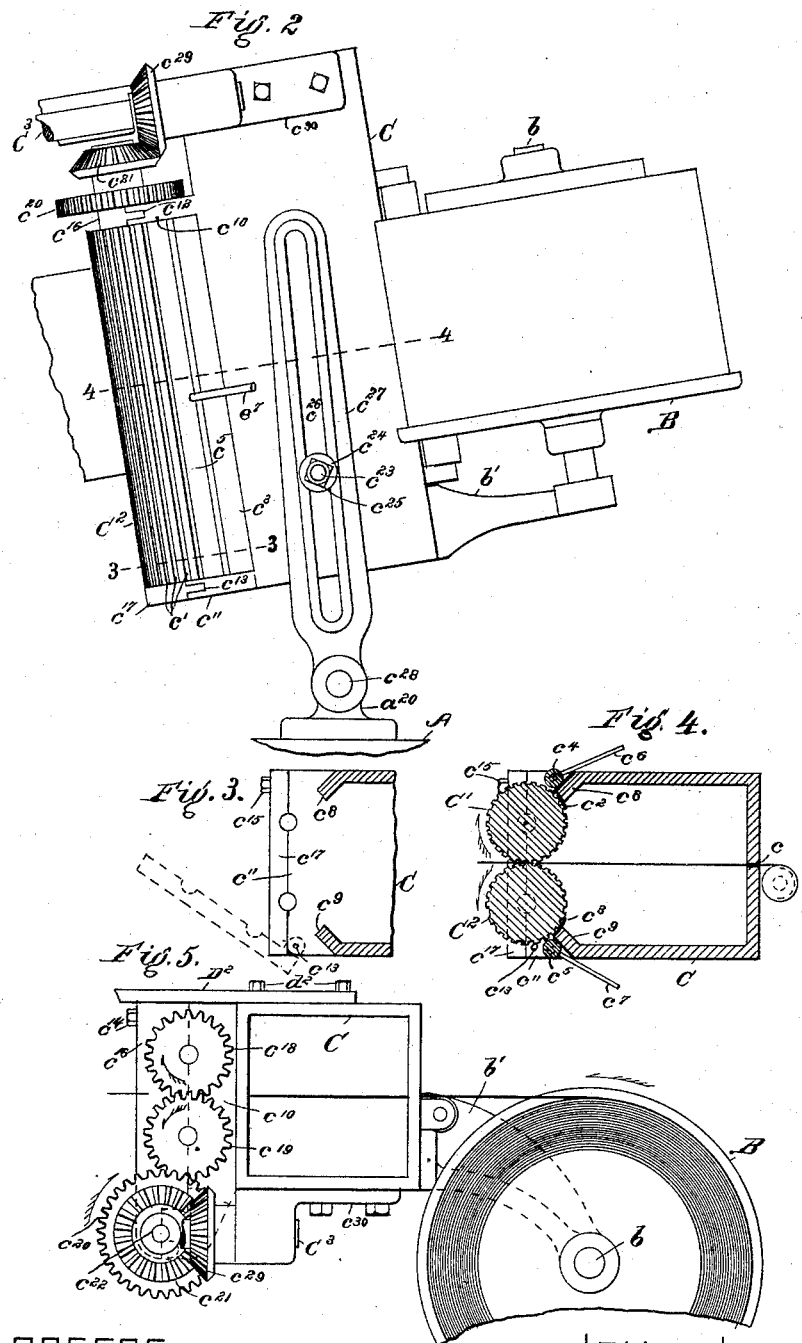

(No Model.) 12 Sheets—Sheet 3.
J. C. CORAM & F. D. HUNTOON.
MACHINE FOR MAKING PAPER TUBES.
No. 475,721. Patented May 24, 1892.
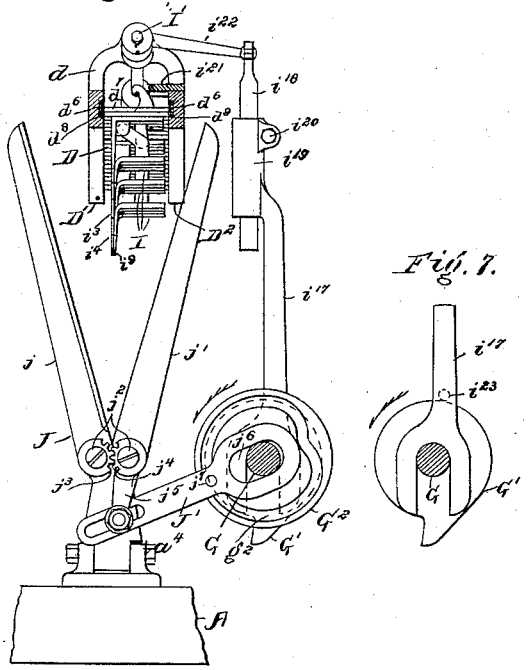
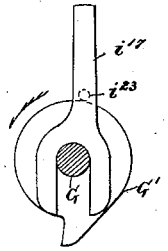
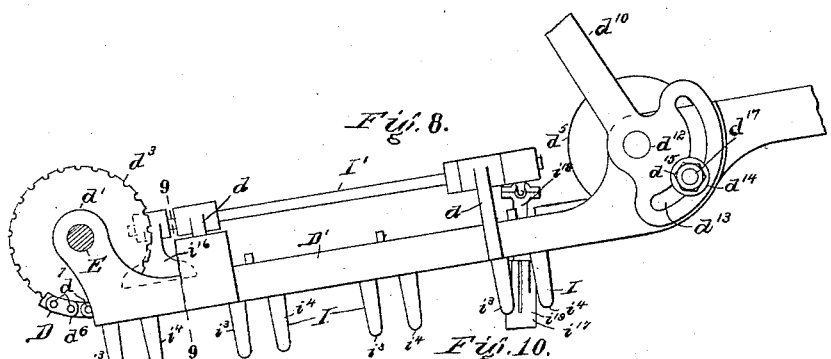
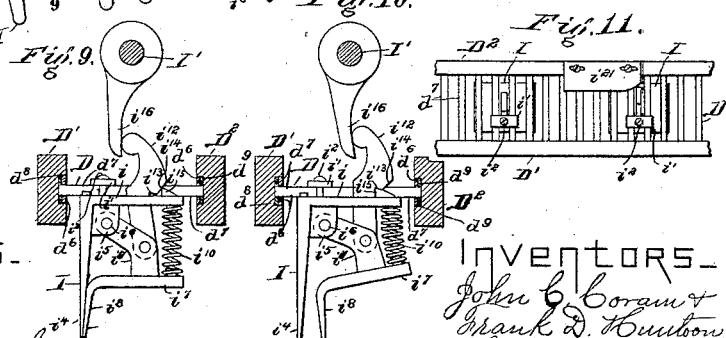
Witnesses:
Kirkley J Hyde.
Myrtie C. Beals.
Inventors:
John C. Coram &
Frank D. Huntoon,
By Albert M. Moores,
Their Attorney.

(No Model.) 12 Sheets—Sheet 4.
J. C. CORAM & F. D. HUNTOON.
MACHINE FOR MAKING PAPER TUBES.
No. 475,721. Patented May 24, 1892.
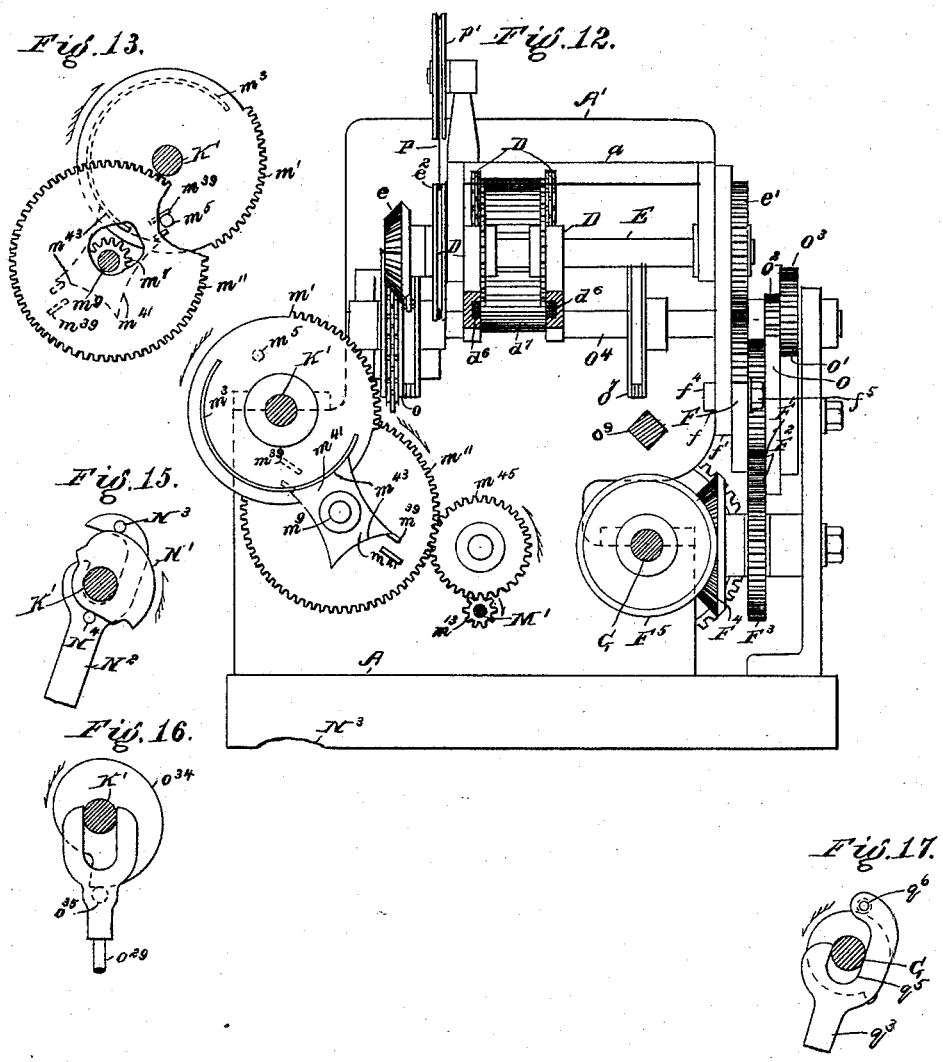
Witnesses
Kirkley Hyde.
Myrtie C. Beals.
Inventors
John C. Coram &
Frank D. Huntoon,
By Albert M. Moore,
Their Attorney.

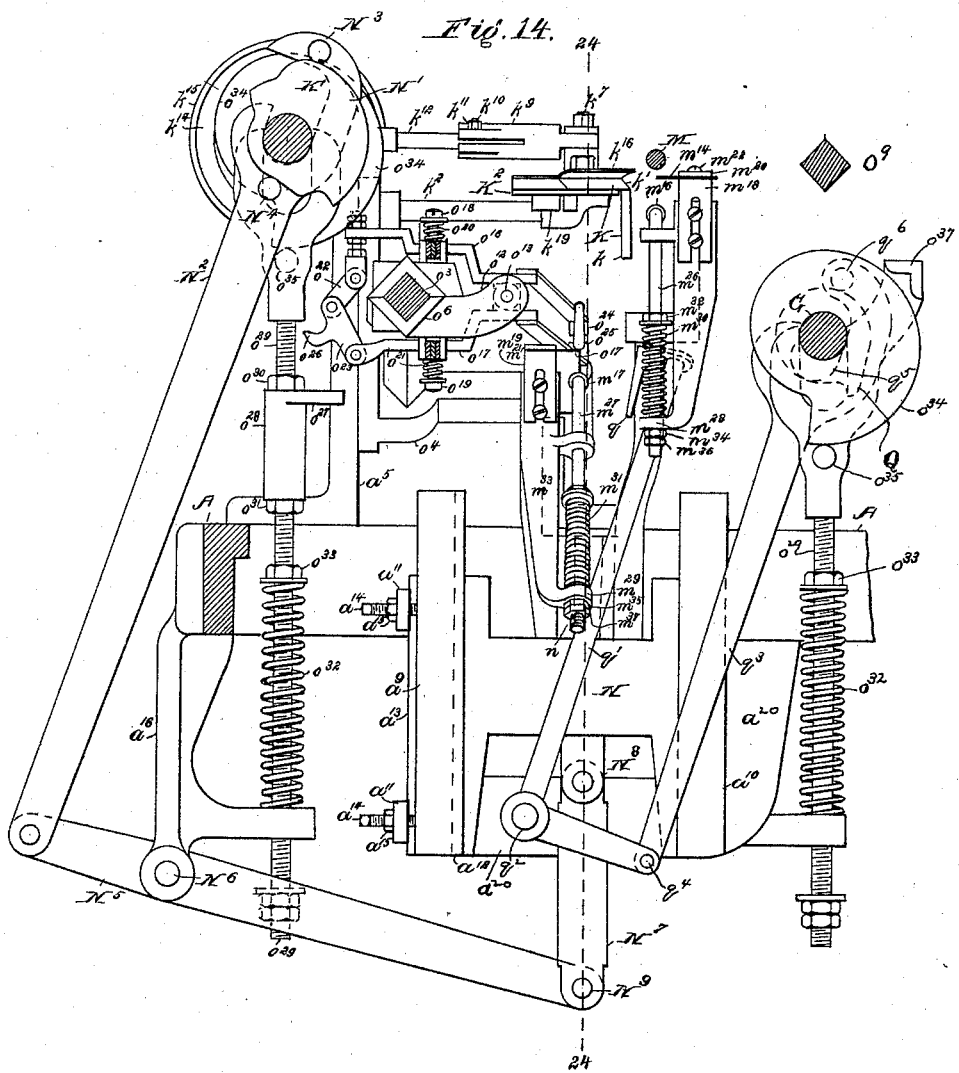

(No Model.) 12 Sheets—Sheet 6.
J. C. CORAM & F. D. HUNTOON.
MACHINE FOR MAKING PAPER TUBES.
No. 475,721. Patented May 24, 1892.
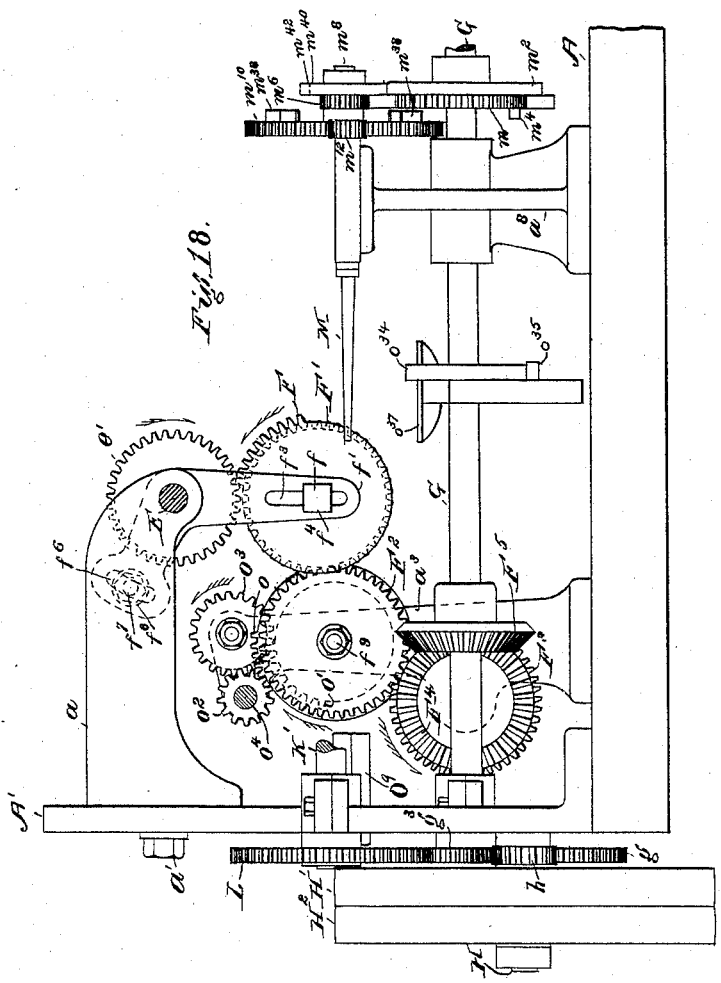

(No Model.) 12 Sheets—Sheet 7.

J. C. CORAM & F. D. HUNTOON.
MACHINE FOR MAKING PAPER TUBES.

No. 475,721. Patented May 24, 1892.

Witnesses
Kirkley Hyde.
Myrtie C Beals.

Inventors
John C. Coram &
Frank D. Huntoon,
By Albert M. Moore,
Their Attorney.

(No Model.) 12 Sheets—Sheet 8.
J. C. CORAM & F. D. HUNTOON.
MACHINE FOR MAKING PAPER TUBES.
No. 475,721. Patented May 24, 1892.
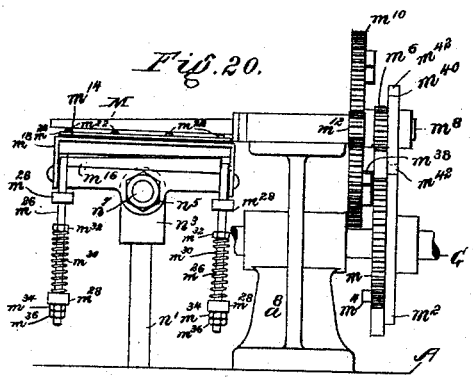
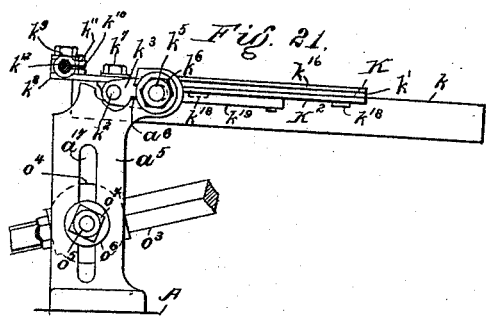
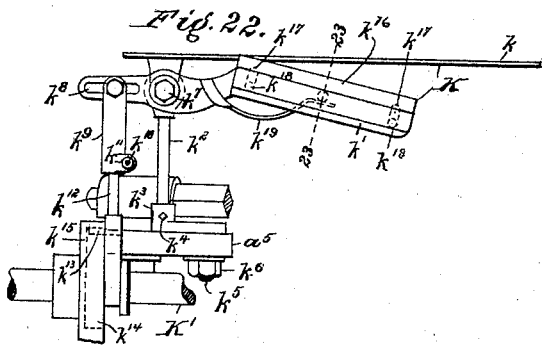
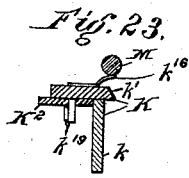

(No Model.) 12 Sheets—Sheet 9.
J. C. CORAM & F. D. HUNTOON.
MACHINE FOR MAKING PAPER TUBES.
No. 475,721. Patented May 24, 1892.
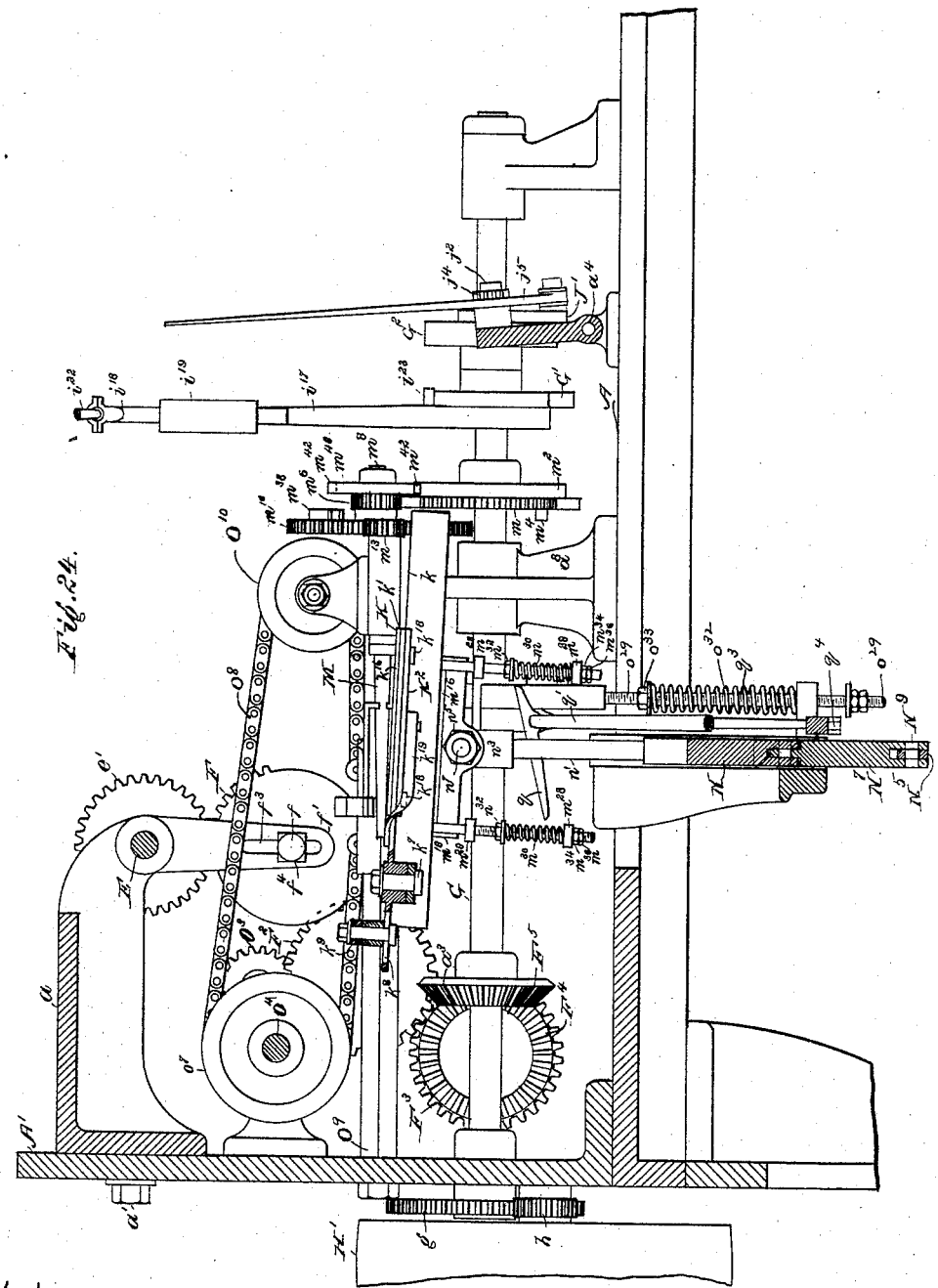
Witnesses
Hinkley Hyde.
Myrtie C. Beals.
Inventors
John C. Coram &
Frank D. Huntoon,
By Albert M. Moore
Their Attorney.

(No Model.) 12 Sheets—Sheet 11.
J. C. CORAM & F. D. HUNTOON.
MACHINE FOR MAKING PAPER TUBES.
No. 475,721. Patented May 24, 1892.
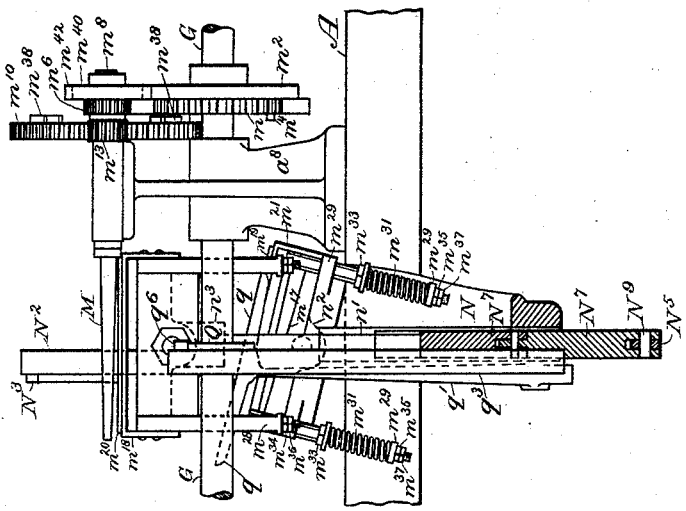
Witnesses.
S. L. Stephens,
Myptic C. Beals.
Inventors.
John C. Coram &
Frank D. Huntoon,
By Albert M. Moore,
Their Attorney.

(No Model.) 12 Sheets—Sheet 12.

J. C. CORAM & F. D. HUNTOON.
MACHINE FOR MAKING PAPER TUBES.

No. 475,721. Patented May 24, 1892.

Witnesses.
S. G. Stephens.
Myrtie C. Beals.

Inventors.
John C. Coram &
Frank D. Huntoon,
By Albert M. Moore,
Their Attorney.

UNITED STATES PATENT OFFICE.

JOHN C. CORAM AND FRANK D. HUNTOON, OF LOWELL, MASSACHUSETTS, ASSIGNORS, BY DIRECT AND MESNE ASSIGNMENTS, TO THE AMRAYTOON PAPER TUBE COMPANY, OF SAME PLACE.

MACHINE FOR MAKING PAPER TUBES.

SPECIFICATION forming part of Letters Patent No. 475,721, dated May 24, 1892.

Application filed September 4, 1889. Serial No. 322,944. (No model.)

*To all whom it may concern:*

Be it known that we, JOHN C. CORAM, a subject of Victoria, Queen of the United Kingdom of Great Britain and Ireland, and FRANK D. HUNTOON, a citizen of the United States, both residing at Lowell, in the county of Middlesex and Commonwealth of Massachusetts, have invented a certain new and useful Improvement in Machines for Making Paper Tubes, of which the following is a specification.

Our invention relates to machines for making paper tubes; and it consists in the devices hereinafter described and claimed, the general object of which is to take a strip of paper from a roll of paper, to apply paste to opposite sides of the strip, to cut the strip into pieces suitable for two or more blanks, to cut the severed paper into single blanks, to roll them into tubes, and to remove them from the spindles or mandrels on which they are rolled.

Figure 24A:
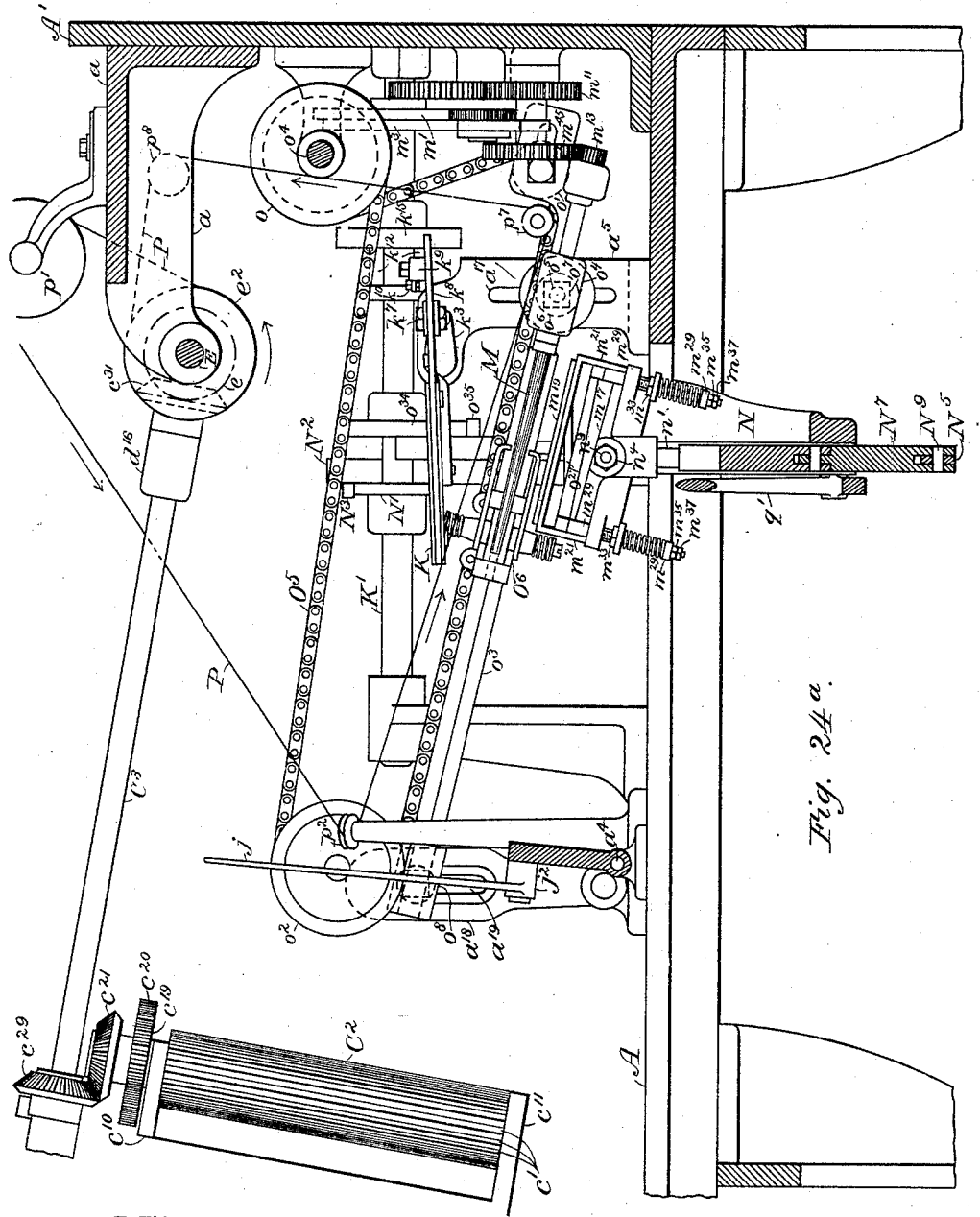
Figure 27:
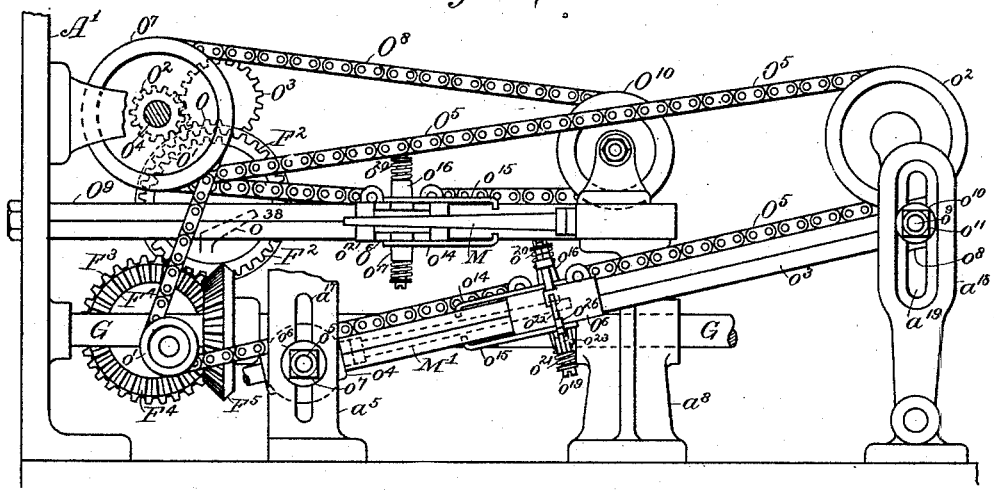
Figure 28:
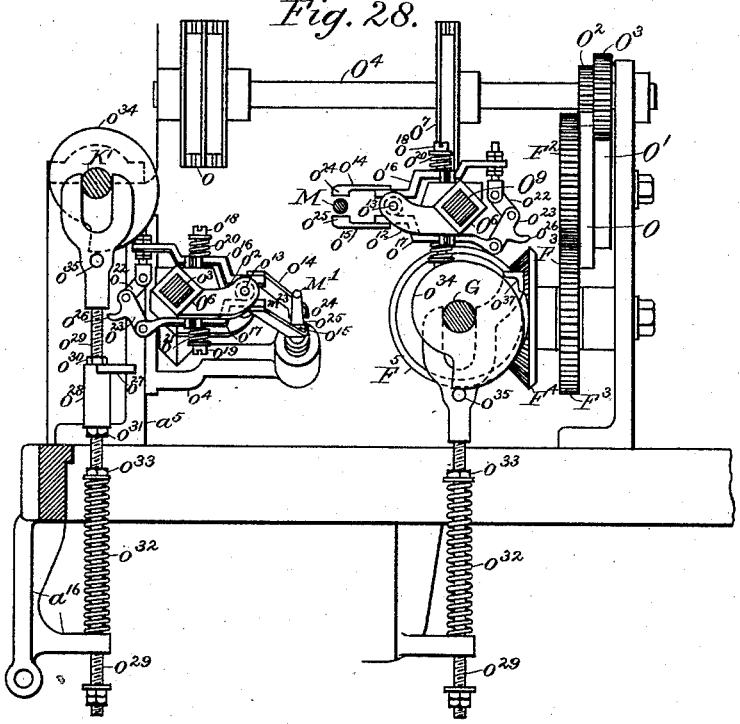

In the accompanying drawings, on twelve sheets, Figure 1 is a front elevation of a part of our machine for making paper tubes, a part of the fast and loose pulleys, the lower part of the bed or horizontal frame of the machine, and a part of the paste-box being broken away and the parts below said bed being omitted, showing the paper-feeding rolls, chain, and grippers, means for opening and closing said grippers, the cutting-off shears, guide-cords, mechanism for operating the dividing-shears, mechanism which applies the lower blank to the lower spindle and finishes the tube on the spindle, and mechanism which intermittently rotates the lower spindle and the driving mechanism; Fig. 2, a front elevation of the paste-box, feed-rolls, the gears which drive them, the eccentric rolls which hold the packing in place to prevent the leakage of paste at the sides of the feed-rolls, the paper-reel, a roll of paper thereon, the paper-guide roll, a part of the bed, and means of adjustably supporting the paste-box; Fig. 3, a section on the line 3 3 in Fig. 2, showing a plan of the lower journal-boxes of the feed-rolls. Fig. 4 is a section on the line 4 4 in Fig. 2 of the paste-box, feed-rolls, eccentric packing-rolls, and paper-guide roll; Fig. 5, a plan of the parts shown in Fig. 2, omitting the means for supporting the paste-box. Fig. 6 is a right-side elevation of the cutting-off shears and their operating mechanism and the mechanism which opens the grippers, the feed-chain, and its guide being shown in section on the line 6 6 in Fig. 1, showing also a right-side elevation of some of the grippers; Fig. 7, a right-side elevation of the cam and lower part of the cam-rod of the gripper-opening mechanism; Fig. 8, a front elevation of a part of the feed-chain, its grippers, the feed-chain guide, means for opening and closing the grippers, the sprocket-wheel which drives the feed-chain, and a part of the adjustable arm by means of which the feed-chain is tightened. Figs. 9 and 10 are side elevations of a gripper and a section on the line 9 9 in Fig. 8 of the feed-chain and its guide and the gripper-opening shaft, showing in side elevation the arm which opens the gripper, the gripper being closed in Fig. 9 and open in Fig. 10; Fig. 11, a plan of a part of the feed-chain and its guide, the grippers, and the cam which closes the grippers. Fig. 12 is a right-side elevation of the mechanism for imparting an intermittent motion to the lower spindle and to the feeding and stripping chains and to the cord-guide; Fig. 13, a left-side elevation of a part of the mechanism which intermittently rotates the lower spindle; Fig. 14, a vertical section of a part of the bed of the machine and a right-side elevation of the dividing-shears and their operating mechanism and the appliances which lay the paper upon the spindles and smooth and finish the paper tube and the devices for stripping the finished tubes from the lower spindle, showing the cams which operate these appliances, the cam-rods, and the vertical slide, the shafts which support said cams being in vertical cross-section; Fig. 15, a right-side elevation of the cam which raises the slickers and presser-rolls and the upper portion of its cam-rod, its shaft being in vertical section; Fig. 16, a right-side elevation of the cam which closes the strippers upon the spindle and the cam-rod operated by said cam, showing the cam-shaft in vertical section; Fig. 17, a right-side elevation of the cam which operates to carry the blank to the lower spindle and the upper portion of its cam-rod, the shaft to which said cam is secured being in vertical section; Fig. 18, a front elevation of the upper spindle, mechanism which operates the same, the cam which closes the stripper for the upper spindle, and the rod operated by said cam, the stripper being omitted; Fig. 19, a left-end elevation of the machine, omitting the feed-chain and its upper pulley, a part of the frame of the machine being broken away to show the pinion on the lower spindle; Fig. 20, a front elevation of the upper spindle, driving mechanism, slicker, presser-roll, and means for adjusting said presser-roll; Fig. 21, a front elevation of the dividing-shears, a part of its supporting-standard, and the square shaft on which the strippers for the lower spindle are movable; Fig. 22, a plan of the parts shown in Fig. 21 and also of the cam which operates the dividing-shears and the shaft to which it is secured; Fig. 23, a section on the line 23 23 in Fig. 22; Fig. 24, a vertical section on the line 24 24 in Fig. 14 and in the same plane of the bed, a part of the frame, and one of the brackets; Fig. 24$^a$, another vertical section on the line 24 24 in Fig. 14, but on the opposite side of the plane of section from what is shown in Fig. 24; Fig. 25, a vertical section of a part of the frame and of the spindles and the shafts which support the cams which operate the vertical slide and the appliances which lay the paper upon the spindles and smooth and finish the paper thereon and a right-side elevation of said cams, their connecting rods and levers, the vertical slide, and the parts operated thereby; Fig. 26, a front elevation of the spindles, slickers, and operating mechanism and a vertical central section of the slide; Fig. 27, a front elevation of the spindles (the lower spindle being shown in dotted lines) and the stripping devices and their operating mechanism; Fig. 28, similar to Fig. 14, but omitting some of the parts there shown, and showing in side elevation the stripping devices and their operating mechanism.

The bed A or horizontal part of the frame and the vertical end part A′, together with various standards, hereinafter mentioned, are preferably formed of cast-iron or other metal and should be of sufficient strength to support the operative parts of the mechanism.

The paper or other sheet material from which the tubes are to be formed is first cut or otherwise formed into a strip of a suitable width to form two blanks such as are hereinafter described and is placed on the paper-reel B, (shown in Figs. 2 and 5,) said reel being of any usual form adapted to enter a cylindrical roll of paper and turning freely upon a stud $b$ as the paper is drawn from said reel by the feeding devices, said stud being supported upon a bracket $b'$, secured to the paste-box C. The paper is drawn from the reel through a narrow slit $c$, Fig. 4, in the paste-box C and through the paste therein contained and out at the opposite side of the box in the usual manner, except that the paper, instead of emerging from the paste-box through a second slit, as is customary, passes between nearly-cylindrical feed-rolls C′ C², having axes parallel with the stud $b$ and with the slit $c$. The feed-rolls C′ C² are provided with narrow shallow grooves $c'$, and their curved surfaces are placed in contact with each other, so as to allow no paste to escape between except such as adheres to the sides of the paper drawn between them, the grooves $c'$ allowing a sufficient quantity of paste to pass through with the paper. The slit $c$ is packed in the usual manner to prevent the escape of paste, and the joints between the feed-rolls and the sides of the paste-box are also packed, preferably by sheets $c^2$ $c^3$ of felt or other slightly-elastic material placed between said rolls and sides, the sides near the rolls being bent inward about radially to said rolls at $c^8$ $c^9$, Figs. 3 and 4, and the sheets being clamped against the bent parts of the box by eccentrically-journaled rolls $c^4$ $c^5$, arranged parallel with said sides and feed-rolls and provided with handles $c^6$ $c^7$, by which they may be turned to clamp said sheets $c^2$ $c^3$. The escape of paste under the rolls may also be prevented by a packing arranged below said rolls; but this is hardly necessary if the rolls at their lower ends are true and fit the lower shelf $c^{11}$, in which they are journaled.

The journal-boxes of the feed-rolls are partly in the parallel shelves $c^{10}$ $c^{11}$, cast or otherwise secured on the paste-box, Figs. 1 to 5, and partly in the half journal-boxes hinged at $c^{12}$ $c^{13}$ to said shelves at the front of the paste-box, the journal-boxes being prevented from opening by bolts $c^{14}$ $c^{15}$, which pass through the half journal-boxes $c^{16}$ $c^{17}$ into said shelves.

The feed-rolls are each provided with a spur-gear $c^{18}$ $c^{19}$, concentric with the feed-roll, to the shaft of which it is secured, each of said gears taking into the other and one of said gears taking into another spur-gear $c^{20}$, secured to a miter-gear $c^{21}$, concentrically therewith, and turning upon a stud $c^{22}$, supported upon a forward projection. (Shown by dotted lines in Fig. 5.)

The feed-chain guides, Figs. 1, 6, 8 to 11, are parallel bars D′ D², connected by arches $d$ and capable of swinging in a vertical plane, one end of each of said bars being a sleeve $d'$, which surrounds and turns on a horizontal shaft E, supported by a bracket $a$, secured by bolts $a'$ to the vertical part A′ of the frame of the machine, said bolts passing through slots $a^2$ in said frame A′ to enable the height of said bracket to be varied to raise or lower the feed-chain, according to the different widths of the paper strips. The free end of the bar D² is secured by bolts $d^2$ to the back of the paste-box, so that the paste-box may be raised to any desired height or inclination by swinging said bars or feed-chain guides around said shaft E. The paste-box is held in the desired position by a bolt $c^{23}$ and washer $c^{24}$ and nut $c^{25}$, said bolt passing through the slot $c^{26}$ of the link $c^{27}$ into the side of the paste-box, and said nut turning against said washer on said bolt and clamping said link between said washer and paste-box, and said link being pivoted at its lower end at $c^{28}$ to a bracket $a^{20}$, secured to the bed A of the machine to allow the paste-box to move in an arc of a circle as said box is raised or lowered. In brackets $c^{30}$ $d^{16}$ on the paste-box and bar D', respectively, turns the feed-shaft $C^3$, which carries a miter-gear $c^{29}$, engaging with the miter-gear $c^{21}$, above named, so that a rotation of said feed-shaft causes the feed-rolls to turn and feed the paper through the paste-box. The feed-shaft $C^3$ is provided with a beveled gear $c^{31}$, which engages a beveled gear $e$, secured to the shaft E above named, and said shaft E is provided at its rear end with a spur-gear $e'$, which engages a mutilated intermediate spur-gear F, turning upon a horizontal stud $f$, adjustably supported in an arm $f'$, pivoted to the bracket $a$ above named, said arm being provided with a nearly-vertical slot $f^3$, and the stud $f$ being movable in said slot and retained in any desired position by an enlarged head $f^4$ on one end of said stud and a nut $f^5$ turning on the other end of said stud $f$, Figs. 12 and 18, the upper end of said arm $f'$ being provided with an arc-shaped slot $f^6$, arranged concentric with the pivot of said arm, a bolt $f^7$, passing through said slot $f^6$ into said arm $a$, and a nut $f^8$, turning on said bolt, holding said arm in any desired position to enable such position to be varied when it is desired to change the gears F' and F to vary the length of the paper blank and thus to vary the length of the tube formed therefrom.

Secured to the mutilated spur-gear F concentrically therewith is a spur-gear F', which engages another spur-gear $F^2$, turning on the stud $f^9$, secured in the standard $a^3$ or part of the frame, said last-named spur-gear engaging still another spur-gear $F^3$, which turns on a horizontal stud on said standard $a^3$ and has secured to it concentrically therewith a beveled gear $F^4$, which engages another beveled gear $F^5$, fast on the transverse shaft G. The shaft G has secured to its outer end, outside of the frame, a spur-gear $g$, which takes into a spur-pinion $h$ on the main shaft H, to which is secured the driving-pulley H' and on which turns freely the loose pulley $H^2$. The revolution of the fast pulley H' therefore causes a revolution of the feed-rolls, the motion of the feed-rolls being intermittent because of the mutilation of the intermediate gear F above described.

The feed-chain D is carried on the sprocket-wheel $d^3$ and on the idle-rolls $d^4 d^5$, said sprocket-wheel $d^3$ being secured on the same shaft E with the miter-gear $e$, so that the feed-chain has an intermittent motion, moving when and only when the feed-rolls are in motion. The feed-chain D in fact consists of two chains or parallel series of equal links $d^6$, the bars or pivots $d^7$, which connect adjacent links of one series, also connecting the opposite links of the other series, so that said bars are parallel with each other, as shown in Fig. 12, and the adjacent inner faces of the feed-chain guides are provided with straight parallel longitudinal grooves $d^8 d^9$, one in each of said inner faces, to receive and guide one series of links of the feed-chain in a straight line, Figs. 6, 9, 10, and 12.

To the feed-chain D are adjustably secured the grippers I, each having a plate $i$, adapted to rest against the outer surface of the bars $d^7$ of the feed-chain and held in place against said bars by a clamp $i'$ and cap-screw $i^2$, running through said clamp into the top of said plate $i$. The top of the plate is provided with a pair of downhanging fingers $i^3 i^4$, the rear faces of which lie in a vertical plane. To an ear $i^5$ on the plate $i$ is pivoted at $i^6$ another plate $i^7$, provided with another pair of downhanging fingers $i^8 i^9$, (for fingers $i^9$ see Fig. 6,) the front faces of which are normally held against the rear faces of the fingers $i^3 i^4$ by one or more springs $i^{10}$, compressed between the plates $i i^7$, said last-named plate $i^7$ having an arm $i^{11}$, which extends upward to said ear $i^5$, the pivot $i^6$ passing through the upper end of said arm $i^{11}$. To the arm $i^{11}$ is pivoted a latch $i^{12}$, reaching upward through a slot in the plate $i$ for some distance and having a notch $i^{13}$ to engage with the top of an upward projection $i^{15}$ on the top of said plate $i$ and immediately above said notch having a bevel or incline $i^{14}$, extending upward and backward, so that throwing the upper end of said latch backward causes the latch to be raised by its incline riding up over said projection and the rear edge of the plate $i^7$ to be raised and the fingers $i^8 i^9$ to swing back away from the fingers $i^3 i^4$ into the position in Fig. 10, where they are retained by said notch $i^{13}$ engaging or hooking over the top of said upward projection $i^{15}$ until the upper end of the latch is again thrown forward to the left in Fig. 10, when the fingers will be closed or brought together by the spring $i^{10}$. The grippers are caused to open by the upper end of the latch being struck by a finger $i^{16}$ on the shaft I', said shaft turning in the arches $d$, supported on the feed-chain guides, and being rocked by an arm $i^{22}$, reaching backward from the shaft I', and being jointed to a vertical rod $i^{17}$, made in two parts for purposes of adjustment, the upper part $i^{18}$ of said rod being a straight solid rod and the lower part of said rod $i^{17}$ having a split sleeve $i^{19}$, which clamps the part $i^{18}$, said sleeve being closed by a screw $i^{20}$ in an obvious manner. The lower end of the rod $i^{17}$ is slotted to receive and be guided by the shaft G above named and is raised by a pin $i^{23}$, projecting from said rod, being struck by a cam G', secured on said shaft G. (See Fig. 7.) The gripper remains open until it again passes over the idle-pulleys and strikes the stationary cam $i^{21}$, secured to the top of the bar $D^2$, which stationary cam throws the upper end of the latch forward and closes the gripper just after its fingers have reached down on opposite sides of the paper—that is, just before the gripper reaches the cutting-off shears. As soon as the paper is grasped by the grippers nearest the idle-roll $d^5$ the paper stops—that is, the feed-chain and the feed-rolls stop—and a double blank $b^2$ or piece of paper large enough for two blanks is cut from the end of the strip of paper by the vertical cutting-off shears J, which consist of two blades $j\ j'$, pivoted near their lower ends at $j^2$ upon a post or standard $a^4$, supported on the bed A of the machine, each blade being provided with a segment of a gear $j^3\ j^4$, concentric with its pivot $j^2$, which takes into the gear-segment on the other blade, and one of said blades having an arm $j^5$, which reaches down below the pivot $j^2$ and is adjustably jointed to a cam-rod J', which is provided with a slot $j^6$ to receive and be guided by the shaft G above named, and is also provided with a projecting pin $j^7$, which enters a cam-groove $g^2$ in the cam $G^2$, secured on said shaft G, so that when said last-named cam makes a half-revolution from the position it occupies in Fig. 6 the pin $j^7$ is drawn nearest to said shaft G and draws the cam-rod J' and the arm $j^5$ of the blade $j'$ backward and closes the cutting-off shears.

As the shaft G has a constant motion when the machine is in operation and the feeding devices have an intermittent motion, it is necessary to vary the speed of the feeding devices or to operate them for a greater length of time when it is desired to increase or decrease the horizontal length of the blank, and this is accomplished by changing the gears F' and F, as above stated. This necessitates, usually, the moving of the grippers nearer together or farther apart on the feed-chain, which is accomplished by removing the cap-screws $i^2$ and clamps $i'$ and again securing the grippers to the chain at proper intervals, which intervals must be equal, and this fact may require the chain to be lengthened or shortened by the insertion or removal of one or more links. It is therefore necessary that means be furnished of taking up the slack of the chain when the chain is lengthened. Accordingly one $d^4$ of the idle-rolls is supported upon an arm $d^{10}$ and turns upon a horizontal stud $d^{11}$, secured to the free end of said arm, and said arm is pivoted near its lower end at $d^{12}$ upon the upper end of the feed-chain guide D' and is provided with an arc-shaped slot $d^{13}$, arranged concentrically with the pivot $d^{12}$, through which slot projects a stud $d^{17}$ from the feed-chain guide D', and on said stud is arranged a washer $d^{14}$ and a nut $d^{15}$, so that turning up said nut holds said arm $d^{10}$ in any desired position and keeps the feed-chain taut. The other idle-roll $d^5$ is stationary relative to the feed-chain guides, being supported and turning on a horizontal shaft between said guides. The double paper blanks are then carried along by the grippers to the nearly-horizontal dividing-shears K, (see Figs. 1, 21, 23, 24, and $24^a$,) supported on a standard $a^5$, secured to the bed A, the stationary blade $k$ of said dividing-shears being supported on a horizontal arm $k^2$, which is preferably fixed in a holder block or casting $k^3$ by a set-screw $k^4$, Fig. 22, and projects through into a slot $a^6$ in said standard $a^5$ near the top of the same, as shown in Fig. 1, so that it may be adjusted by loosening the screw $k^4$ to move said blade into parallelism with the upper spindle. The holder $k^3$ is secured to the standard $a^5$ by a screw-bolt $k^5$, passing through the slot $a^6$ and held by a nut $k^6$, turning on the front end of said bolt $k^5$, to enable the holder and dividing-shears to be adjusted when said nut $k^6$ is loosened in the direction of the length of said dividing-shears, that the shears may be so placed as to cut entirely through one double blank without cutting the following double blank.

The upper movable blade $k'$ of the dividing-shears is pivoted on a nearly-vertical pin $k^7$, projecting upward from the horizontal arm $k^2$ above named and is provided with a slotted arm $k^8$, extending in the opposite direction from the cutting-arm of said movable blade, to which slotted arm $k^8$ is pivoted the split sleeve $k^9$ by means of a bolt $k^{10}$ and a nut $k^{11}$, which nut being loosened allows the throw of the movable blade to be varied, said sleeve receiving one end of an eccentric-rod $k^{12}$, the outer end of which is provided with a pin $k^{13}$, which enters a cam-groove $k^{14}$ in the cam $k^{15}$, secured on the front shaft K', said pin $k^{13}$ and cam $k^{15}$ being just like the arm $j^7$ and cam $G^2$, which operates the cutting-off shears, so that the rotation of said shaft K' closes the dividing-shears and divides the paper cut from the strip into two equal trapezoidal blanks—that is, blanks each having parallel vertical ends and equally-diverging top and bottom edges.

The front shaft K' has secured to it a gear L, which engages an intermediate gear $g^3$, (see Fig. 19,) which takes into the gear $g$ above named and is driven thereby at a constant and uniform speed to close the shears K once in every revolution of said shaft K'. At the top of the movable blade $k'$ of the dividing-shears is secured a strip $k^{16}$ of sheet metal, the rear edge of which is raised considerably above the top of said blade and serves as a bender to push the lower edge of the upper single blank under the upper spindle M in position to be struck by the slicker, and to the under side of said movable blade $k'$ is secured the retainer $K^2$, the same being a plate having slots $k^{17}$, through which pass bolts $k^{18}$ into the under side of said movable blade in such a manner as to allow said retainer to move on said blade while held in contact therewith by the heads of said bolts. A spring $k^{19}$, secured to said movable blade and pressing against a pin $k^{20}$ on said retainer, forces the latter backward to or beyond the cutting-edge of the movable blade when the shears are open, so that in closing the shears K the retainer is pressed against the paper before the same is divided and after division holds the upper edge of the lower blank and causes said lower blank to remain in a vertical position. The lower blank, however, is thus held only long enough to allow its lower edge to be applied to the lower spindle M' by means of a bender $q$, which may be of sheet metal and secured to the upper end of a bell-crank lever $q'$, pivoted at $q^2$ on the horizontal lower part of the bracket $a^{20}$, which is secured to the frame of the machine and supports the guides $a^9$ $a^{10}$ of the slide N, hereinafter described, said lever being swung forward by the cam-rod $q^3$, the lower end of which is jointed at $q^4$ to the free end of the lower arm of said lever, the upper end of said cam-rod having a guide-slot $q^5$, which embraces the shaft G, and having, also, a lateral projection $q^6$, which rests upon the top of the periphery of the cam Q, the rotation of which cam raises said cam-rod once in every revolution of said shaft, said cam being fast on said shaft. When the upper end of the lever $q'$ is swung forward, the front edge of the bender $q$ presses the lower edge of the lower single blank under the lower spindle into a position to be struck by the lower slicker. (See Figs. 14, 17, 24, 25, and 26.) The return movement of the bender $q$ is effected by the weight of the lever $q'$ and cam-rod $q^2$.

The spindle M, Figs. 18 to 20, is given an intermittent rotary motion by the shaft G above named by gearing substantially like that which drives the lower spindle M', the latter being shown in Fig. 13, except that the position of the gears is changed from what is shown in said last-named figure. The mutilated spur-gear $m$, Figs. 18 to 20, corresponding in shape and function to the gear $m'$, Figs. 12 and 13, is secured to said shaft G concentrically therewith and is provided with the segment $m^2$ of an annular flange corresponding to the flange $m^3$ in Figs. 12 and 13, concentric with said shaft G, and is also provided with a laterally-extending stud $m^4$, corresponding to the stud $m^5$ in Figs. 12 and 13. The teeth of the mutilated gear engage a pinion $m^6$, secured on the shaft $m^8$, and impart to said last-named shaft an intermittent rotary motion, and a gear $m^{10}$, fast on said shaft $m^8$, engages a pinion $m^{12}$ on the upper spindle M and causes said spindle to revolve intermittently in its bearings in the standard $a^8$, supported on the bed A. The stud $m^4$ enters between the parallel projections $m^{38}$, cast or otherwise formed on the gear $m^{10}$, in advance of the engagement of the mutilated gear $m$ with the pinion $m^6$. The projections being near the circumference of the gear $m^{10}$ and the stud $m^4$ being at some distance from the circumference of the gear $m$, gives to the gear $m^{10}$ and pinion $m^6$ an initial slow motion before said pinion $m^6$ is engaged by said mutilated gear $m$ and rotated directly thereby at greater speed, thus rotating the spindle M at first very slowly until the paper has made a complete lap around the spindle and the danger of the paper slipping on the spindle is passed. As represented, a single rotation of the gear $m$ rotates the gear $m^{10}$ one and a half times, so that two sets of the projections $m^{38}$ are necessary. The stud $m^4$ is not disengaged from the projections $m^{38}$ until after the mutilated gear $m$ has engaged with the pinion $m^6$. A stop $m^{40}$, secured to the shaft $m^8$ or to the gear $m^{10}$ concentrically with both of the same, has two opposite concave faces $m^{42}$, with the same curvature as the flange $m^3$, and receives said flange and prevents the motion of said shaft $m^8$ except when the gear $m^{10}$ and pinion $m^6$ are being rotated, as above described. Immediately after the laying of the paper against the upper spindle M the slicker $m^{14}$, consisting of a sheet of flexible material, preferably rubber, arranged in a suitable holder, hereinafter described, is raised and wipes the lower edge of the upper blank partly around the upper spindle, laying said lower edge smoothly on said spindle, and passes up by said upper spindle, and immediately thereafter a taper roller $m^{16}$, having the same taper as the spindle and tapering in the same direction, is brought into contact with the paper on said spindle and is driven by frictional contact therewith, pressing the different layers firmly together, the means of raising said slicker and presser-roll being shown in Figs. 14, 20, 24, 24ª, 25, and 26 and hereinafter described, the slicker in returning to position rubbing the outer edge of the paper downward on the tube. As already stated, the lower spindle is driven substantially as the upper spindle is driven. Of the parts not previously named as connecting the lower spindle with its driving-shaft the pinion $m^7$ corresponds to the pinion $m^6$ and is secured on the shaft $m^9$, which corresponds to the shaft $m^8$, and a gear $m^{11}$, fast on said shaft $m^9$ engages an intermediate gear $m^{45}$, which engages the pinion $m^{13}$, secured to the lower spindle M', and causes said lower spindle to rotate in a direction opposite to that in which the upper spindle rotates.

The parts connecting the lower spindle with its driving-shaft are designated by the same letters of reference, but with index-figures in each case greater by one, as designate the corresponding parts which connect the upper spindle and its driving-shaft.

A vertical slide N (see Figs. 14, 24 to 26) moves in vertical guides $a^9$ $a^{10}$, the grooves in said guides being indicated by dotted lines in Fig. 14, the guide $a^{10}$ being merely a grooved vertical piece, while the guide $a^9$ is formed of two vertical pieces, one $a^{13}$ of which is provided with ears $a^{11}$ and the other of which is provided with a V-shaped groove $a^{12}$, which, with the flat contiguous surface of the piece $a^{13}$ of said guide, form a square groove, which fits the edge of the slide N, and screws $a^{14}$, turning in the ears $a^{11}$, may be used to set the grooved part of said guide against the slide and take up any looseness of fit, the screws when adjusted being held by check-nuts $a^{15}$, turning on said screws $a^{14}$ against the ears $a^{11}$. The slide N and its guides are arranged below the spindles, said guides being secured to the bed A of the machine. Rods $n$ $n'$, secured in the slide N, carrying cross-heads $n^2$ $n^3$, pivoted on said rods $n$ $n'$ and secured at any desired angle by nuts $n^4$ $n^5$, turning on the threaded ends of the pivots $n^9 n^7$, allow the slickers $m^{14}$ $m^{15}$, supported by said cross-heads, to be adjusted into parallelism with the surface of the spindle and the tube being formed thereon, whatever the taper of the spindle may be, each slicker (see Figs. 14, 20, 23 to 26) being secured between two plates $m^{18}$ $m^{20}$ $m^{19}$ $m^{21}$ of sheet metal, secured to each other by screws $m^{22}$ $m^{23}$, the lower of said plates $m^{18}$ $m^{19}$ being bent downward near its ends and secured to the ends of said cross-heads by other screws $m^{24}$ $m^{25}$. Each presser-roll $m^{16}$ $m^{17}$ turns in journals in the upper ends of vertical rods $m^{26}$ $m^{27}$, sliding freely in brackets $m^{28}$ $m^{29}$, secured to the cross-heads $n^2$ $n^3$, said rods being surrounded by spiral springs $m^{30}$ $m^{31}$, the tension of which is adjusted by means of nuts $m^{32}$ $m^{33}$, turning on said rods $m^{26}$ $m^{27}$ above said springs, the distance to which the presser-roll may rise above its cross-head being limited by nuts $m^{34}$ $m^{55}$ and check-nuts $m^{36}$ $m^{37}$, turning on rods below said brackets $m^{28}$ $m^{29}$. The slide N is given a reciprocating vertical motion by means of a cam N′, fast on the shaft K′, (see Figs. 14 and 19,) a cam-rod $N^2$, having a guide-slot, which embraces said shaft, and having lateral projections $N^3$ $N^4$, which rest against the periphery of said cam N′, and a lever $N^5$, pivoted at its front end, Fig. 14, to the lower end of said cam-rod $N^2$ and turning upon a fulcrum $N^6$ on the bracket $a^{16}$, said bracket being secured to the bed or table A and the rear end of said lever $N^5$ being connected to the slide N by a link $N^7$, one end of which is pivoted at $N^8$ to said slide and the other end of which is pivoted to said lever at $N^9$.

Concentric with and secured to the constantly-rotating spur-gear $F^2$ (the motion of which has been explained in connection with the operation of the feed-chain and feed-rolls) turn two mutilated gears O O′, (see Figs. 1, 12, 18, 27, and 28,) one of which engages the gear $O^2$ and the other O′ of which engages the intermediate gear $O^3$ at different periods during the revolution of said gear $F^2$, and the gears $O^2$ and $O^3$ are always in engagement, so that the gear $O^2$ and its shaft $O^4$, on which it is fast, is rotated first in one direction by the mutilated gear O and then in the opposite direction by the mutilated gear O′, acting through said intermediate gear $O^3$. The shaft $O^4$ has secured to it a double-flanged pulley $o$, Fig. 12, on which and on two idle-pulleys $o'$ $o^2$ runs the stripping-chain $O^5$, first in one direction and then in the other, the ends of said stripping-chain, which is in two lengths, being attached to the pulley $o$ and to the stripper-slide $O^6$, which runs on the inclined stationary square shaft $o^3$, the latter being supported near one end on the standard $a^5$ above named by a bracket $o^4$, for convenience formed in two parts, and having a screw-threaded arm $o^5$, which reaches through a vertical slot $a^{17}$ in said standard and carries a washer $o^6$ and nut $o^7$, by loosening which the shaft $o^3$ may be raised or lowered or its inclination varied, said shaft $o^3$ being adjustably supported near its other end by a similar bracket $o^8$, arms $o^9$, washer $o^{10}$, and nut $o^{11}$ on another standard $a^{18}$, having a similar vertical slot $a^{19}$. To the slide $O^6$ is secured the arm $o^{12}$, to the rear end of which are pivoted at $o^{13}$ the strippers $o^{14}$ $o^{15}$, which strip the lower spindle M′, each of said strippers having arms $o^{16}$ $o^{17}$, arranged at about right angles with the strippers proper and bent to clear the slide $O^6$. Through the arms $o^{16}$ $o^{17}$ are screws $o^{18}$ $o^{19}$, surrounded by spiral springs $o^{20}$ $o^{21}$, which normally hold the strippers proper away from each other and from the lower spindle, said springs being compressed between the heads of said screws and said arms. The front ends of the arms $o^{16}$ $o^{17}$ are connected by toggle-levers $o^{22}$ $o^{23}$, which being caused to approach the same straight line throw the strippers proper nearer each other and cause their free ends $o^{24}$ $o^{25}$, which are bent toward each other, to strike the lower spindle between its bearings and the paper tube. The strippers are closed by a forward projection $o^{26}$ on the lower toggle-lever $o^{23}$ being struck by a backward projection $o^{27}$ on a sleeve $o^{28}$, which is adjustable on the screw-threaded cam-rod $o^{29}$ by means of nuts $o^{30}$ $o^{31}$, turning on said rod above and below said sleeve, said cam-rod being raised by a spring $o^{32}$, surrounding said cam-rod $o^{29}$ and compressed between the bracket $a^{16}$ above named and a nut $o^{33}$, turning on said rod above said spring. The cam-rod $o^{29}$ is thrown down by the cam $o^{34}$, secured on the shaft K′ and pressing against a lateral projection $o^{35}$, with which said rod is provided, to compress the spring $o^{32}$. The strippers are opened by the projection $o^{26}$ being thrown downward by running under the incline $o^{36}$. (See Figs. 1a, 14, and 28.)

The devices which remove the finished tube from the upper spindle are merely duplicates of those above described, except that they move parallel with the upper spindle instead of with the lower, and are therefore designated by the same letters of reference as are applied to the corresponding parts of the lower stripper, except as implied in the remainder of this paragraph, the other stripping-chain $O^8$ (shown in Fig. 27) being moved by the single pulley $O^7$ on the same shaft $O^4$ and running over an idle-pulley $O^{10}$, but moved in the opposite direction, as the spindles point in nearly, though not quite, opposite directions, the chain $O^8$ being open and in a single piece, while the corresponding chain $O^5$, which operates the lower stripper, is in effect crossed, the square shaft $O^9$, which corresponds to the square shaft $o^3$ in function and supports the slide of the upper stripping device, being supported in an obvious manner on the standard A′, the upper strippers being closed by a projection $o^{37}$ on the upper end of the rear cam-rod $o^{29}$ (shown at the right in Figs. 14 and 28) striking the projection $o^{26}$ just as the strippers for the lower spindle are closed by the projection $o^{27}$, carried by the front cam-rod $o^{29}$, and said upper strippers being opened by their projection $o^{26}$ running under a stationary incline $o^{38}$, (see Fig. 27,) like the incline $o^{36}$ in effect, but inclined in the other direction, the cam $o^{34}$, which operates the rear cam-rod, being fast on the shaft G.

The paper blanks, supported at their upper edges by the grippers above described, will naturally hang vertically by their own weight; but to make this more certain and to prevent the paper being blown out of place or being wrinkled by contact with parts of the machine, more particularly the stationary blade of the dividing-shears, the guide-cords P' P² are used, represented in Figs. 1 and 24ª as a single continuous cord P, passing from the under side of a grooved pulley $e^2$, fast on the shaft E, thence over guide-rolls or idle-rolls $p'$ $p^2$, thence at P' nearly in the direction the paper runs, but at a greater downward inclination and in front of the paper blanks, thence over other guide-rolls $p^3$ $p^4$ $p^5$, thence to the guide-roll $p^6$ back of the paper blanks, thence substantially parallel at P² to the part P' and separated from said part P' only by the thickness of the paper to the guide-roll $p^7$, thence over the guide-roll $p^8$ and over the pulley $e^2$. The guide-cords P' P² or parallel parts of the cord P run in the same direction as the paper blanks travel, except that the cords descend faster than the blanks, and therefore not only hold the blanks in a vertical position but by downward friction on the sides of the blanks prevent wrinkling of the same and tend to remove any wrinkles that might be therein. The guide-cords have an intermittent motion, moving when the feed-chain moves, being driven from the same shaft E.

Instead of the paste-box above described a paste-box having two slits of the usual form may be used, with feed-rolls arranged wholly outside of the paste-box between the paste-box and the cutting-off shears.

The specific construction of the feeding devices and of the reciprocating cutters, herein called the "cutting-off shears" and "dividing-shears," is not herein claimed, said feeding devices, cutting-off shears, and dividing-shears being, respectively, the subjects of applications Serial Nos. 379,773, 379,771, and 379,772, all of said applications having been filed January 31, 1891.

We claim as our invention—

1. The combination of the paste-box having a slit and feed-rolls arranged partly within said paste-box opposite said slit and parallel therewith, the feed-chain, and means, substantially as described, for giving to said feed-rolls and feed-chain a simultaneous intermittent motion, as and for the purpose specified.

2. The combination of the spindle, the dividing-shears consisting of a fixed blade and a movable blade, and the bender secured to said movable blade above the same to push the lower edge of a paper blank under said spindle, as and for the purpose specified.

3. The combination of the spindle, the feed-chain and grippers having an intermittent motion, the dividing-shears, the bender movable with said shears and arranged to push the edge of a paper blank under the spindle, and the slicker having a flexible edge, and means, substantially as described, for raising said slicker to raise the lower edge of said blank against said spindle, as and for the purpose specified.

4. The combination of the spindle, the stripper-shaft arranged substantially parallel with said spindle, a sleeve sliding on said shaft, strippers provided with arms pivoted to each other and supported on said sleeve, springs to close said strippers, toggle-levers connecting the arms of said strippers, and means, substantially as described, for bringing said toggle-levers in line with each other to close said strippers on said spindle, as and for the purpose specified.

5. The combination of the spindle, the stripper-shaft arranged substantially parallel with said spindle, a sleeve sliding on said shaft, strippers provided with arms pivoted to each other and supported on said sleeve, springs to close said strippers, toggle-levers connecting the arms of said strippers, one of said toggle-levers being provided with an arm, the vertically-reciprocating closing-rod having a projection adapted to strike said arm of said toggle-lever and to close said strippers, the frame, an incline on said frame adapted to be struck by said arm of said toggle-lever to open said strippers, and means, substantially as described, for giving to said sleeve a reciprocating motion on said stripper-shaft, as and for the purpose specified.

6. The combination of the spindle provided with a pinion, a gear engaging said pinion, a stop-wheel having a concave face and concentric with said gear and rotating therewith, another pinion concentric with and secured to said gear, a mutilated gear provided with an arc-shaped flange adapted to fit the concave face of said stop-wheel when the latter is at rest, and means for causing a constant rotation of said mutilated gear to give said spindle an intermittent rotary motion to hold said spindle at intervals from rotation, as and for the purpose specified.

7. The combination of the spindle provided with a pinion, a gear having lateral projections and engaging said pinion, another pinion concentric with and secured to said gear, a mutilated gear engaging said last-named pinion at intervals and provided with a laterally-extending pin arranged to strike the projections on said first-named gear and to rotate the same in advance of the engagement of said mutilated gear with said last-named pinion, and means for causing the constant rotation of said mutilated gear to give said spindle an intermittent rotary motion, slowly at first and then more rapidly, as and for the purpose specified.

8. The combination of two concentric mutilated gears of different diameters secured to each other, means for giving the same a constant rotation in the same direction, an intermediate gear engaging one of said mutilated gears, a pinion engaging the other of said mutilated gears, said intermediate gear and pinion being in constant engagement with each other, but only one of said mutilated gears being in engagement at the same time, a pulley concentric with said pinion and rotating therewith, the stripper-shaft, a sleeve movable thereon, a stripper on said sleeve, and chains connecting said sleeve to said pulley to give said sleeve and stripper a reciprocating motion on said stripper-shaft, as and for the purpose specified.

9. The combination of the spindle, a gripper, the dividing-shears, a bender arranged to push the edge of a paper blank toward the spindle and the slicker, and means for moving the same to carry said blank against said spindle, as and for the purpose specified.

In witness whereof we have signed this specification, in the presence of two attesting witnesses, this 3d day of September, A. D. 1889.

JOHN C. CORAM.
FRANK D. HUNTOON.

Witnesses:
ALBERT M. MOORE,
KIRKLEY HYDE.